(12) United States Patent
Barr et al.

(10) Patent No.: US 7,386,744 B2
(45) Date of Patent: Jun. 10, 2008

(54) RACK EQUIPMENT POWER PRICING PLAN CONTROL SYSTEM AND METHOD

(75) Inventors: Andrew Harvey Barr, Roseville, CA (US); Kirk Michael Bresniker, Roseville, CA (US); Ricardo E. Espinoza-Ibarra, Lincoln, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 823 days.

(21) Appl. No.: 10/801,247

(22) Filed: Mar. 15, 2004

(65) Prior Publication Data

US 2005/0203761 A1 Sep. 15, 2005

(51) Int. Cl.
*G05B 11/01* (2006.01)
(52) U.S. Cl. .................. 713/320; 713/300; 713/310; 713/321; 713/322; 713/323; 713/324; 713/330; 713/340; 700/21; 700/22

(58) Field of Classification Search ............... 713/300, 713/310, 320–324, 330, 340; 700/21, 22
See application file for complete search history.

(56) References Cited

U.S. PATENT DOCUMENTS

| 6,185,423 | B1* | 2/2001 | Brown et al. ............... 455/434 |
| 6,718,213 | B1* | 4/2004 | Enberg ........................ 700/22 |
| 6,826,036 | B2* | 11/2004 | Pereira ....................... 361/624 |
| 7,130,719 | B2* | 10/2006 | Ehlers et al. ............... 700/276 |

\* cited by examiner

*Primary Examiner*—Abdelmoniem Elamin (57) ABSTRACT

A rack equipment power pricing plan control system and method is presented. In one embodiment of the present invention, a power pricing plan rack equipment control method is utilized to control operation of rack equipment. A power pricing plan for operating the rack equipment is established. The rack equipment is operated in accordance with the power pricing plan.

20 Claims, 4 Drawing Sheets

RACK EQUIPMENT POWER PRICING PLAN CONTROL SYSTEM AND METHOD

FIELD OF THE INVENTION

The present invention relates to rack equipment operation management.

BACKGROUND OF THE INVENTION

Electronic systems and circuits have made a significant contribution towards the advancement of modern society and are utilized in a number of applications to achieve advantageous results. Numerous electronic technologies such as digital computers, calculators, audio devices, video equipment, and telephone systems have facilitated increased productivity and reduced costs in analyzing and communicating data, ideas and trends in most areas of business, science, education and entertainment. Frequently, electronic systems designed to provide these advantageous results are realized through the leveraged utilization of centralized resources by distributed network nodes. These centralized resources can consume a significant amount of power and changes in power prices can have significant impacts on the overall cost of operating the centralized resources.

Centralizing certain resources within a distributed network typically provides desirable benefits. Clients interested in engaging a host to provide centralized resources and services typically have a desire to avoid providing the infrastructure, operation and maintenance directly themselves. Managing and maintaining different types of rack equipment and numerous applications in a typical large and complicated centralized networked host resource environment for a variety of different clients raises many challenging operational issues. A typical hosting infrastructure usually involves a variety of support activities that can have a significant impact on the services provided and the cost of the service, such as costs associated with power consumption.

The manner in which centralized resources are operated is very importance. For example, fixed preset rack equipment operating levels are often assigned upon a perceived generic implementation without consideration of variations in economic conditions. The dynamic nature and high variability of power costs and other economic issues can have significant impacts on operation costs. Traditional approaches to changes in power pricing usually involve inflexible default power drops. For example, power is consumed on a constant basis without regard to power price changes. Limited attempts at manually adjusting the rack equipment usually require the operator to have extensive knowledge and understanding of unique features of each piece of equipment. The complexity and typical dynamic interaction of rack equipment tends to increase the probability of human error in making adjustments. In addition, there is usually very little notice of dynamic changes in power pricing and manual reaction techniques usually have difficulty accommodating processing activity with urgent timing requirements.

SUMMARY OF THE INVENTION

A rack equipment power pricing plan control system and method is presented. In one embodiment of the present invention, a power pricing plan rack equipment control method is utilized to control operation of rack equipment. A power pricing plan for operating the rack equipment is established. The rack equipment is operated in accordance with the power pricing plan.

BRIEF DESCRIPTION OF THE DRAWINGS

The accompanying drawings, which are incorporated in and form a part of this specification, illustrate embodiments of the invention by way of example and not by way of limitation. The drawings referred to in this specification should be understood as not being drawn to scale except if specifically noted.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it is understood the present invention may be practiced without these specific details. In other instances, some readily understood methods, procedures, components, and circuits have not been described in detail as not to unnecessarily obscure aspects of the current invention.

Figure 1:
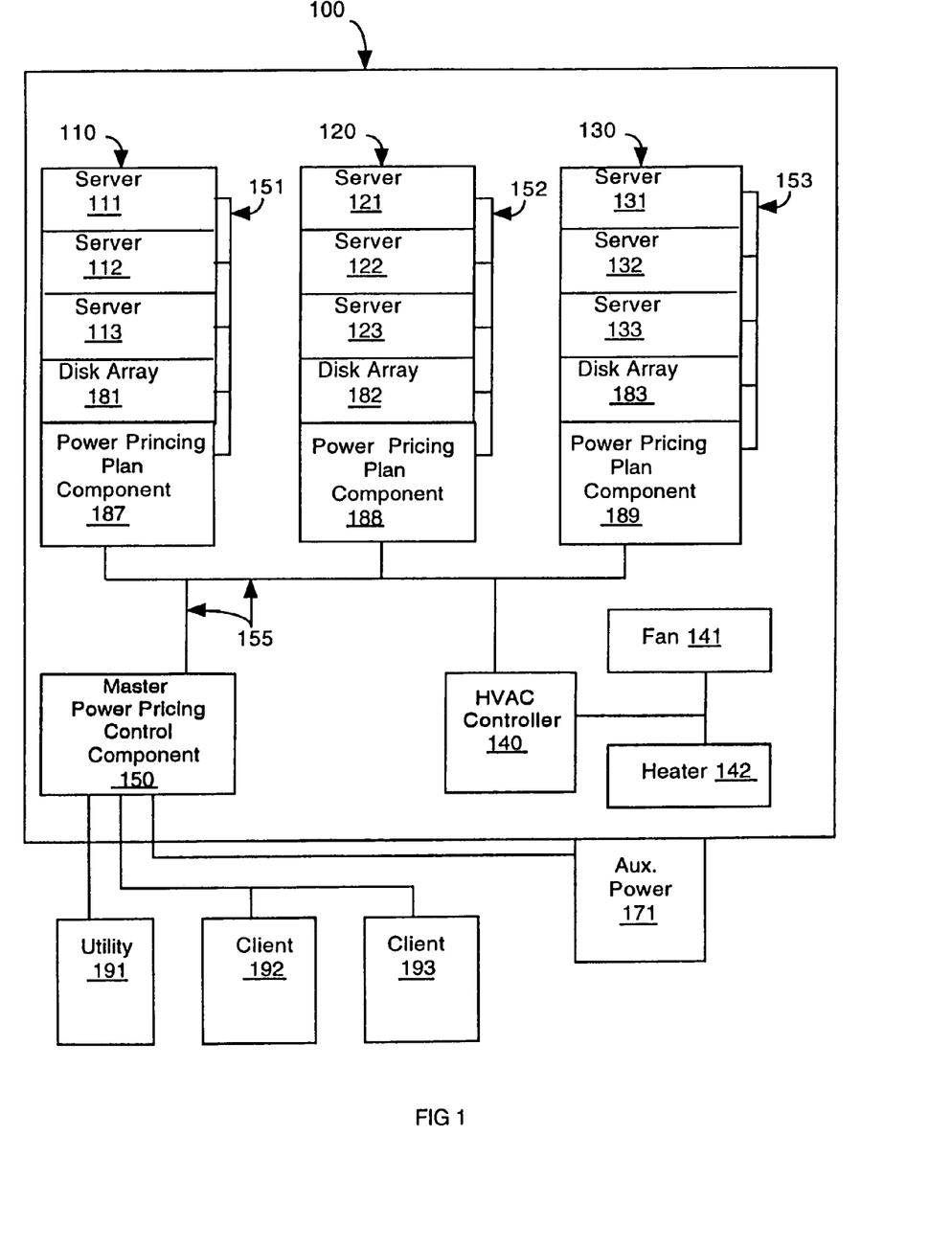
FIG. 1 is an illustration of a power pricing rack equipment control system in accordance with one embodiment of the present invention.

FIG. 1 is an illustration of power pricing rack equipment control system 100, in accordance with one embodiment of the present invention. Power pricing rack equipment control system 100 includes a plurality of racks 110, 120, and 130, master power pricing plan control component 150, and heating, venting and air conditioning (HVAC) controller 140. Equipment racks 110, 120 and 130 comprise servers 111 through 133, disk arrays 181, 182 and 183, and power pricing plan control components units 187, 188 and 189. Master power pricing plan control component 150 is communicatively coupled to equipment racks 110, 120, and 130, and HVAC controller 140 through communication channel 155.

The components of rack equipment power pricing plan control system 100 cooperatively operate to process information and change rack equipment operation settings in accordance with a power pricing plan. The plurality of servers 111 through 133 process information. Disk arrays 181, 182 and 183 store information for processing. Power pricing plan control components 187, 188 and 189 control operational changes to equipment included in equipment racks 110, 120, and 130 based upon a power pricing plan. Master power pricing plan control component 150 coordinates the changes "between" racks 110, 120 and 130 and equipment (e.g., HVAC controller 140) that support operations of multiple racks in accordance with the power pricing plan. Master power pricing plan control component 150 also receives equipment rack power pricing plan related information from power utility 191 and information processing clients 192 and 193. For example, master power pricing plan control component 150 can receive notification of changes in the price of power from power utility 191 (e.g., base load prices, peak load prices, low load prices, etc.) and changes in power pricing plan options from processing clients 192 and 193 (e.g., set different price thresholds for triggering increases or decreases power consumption, change priority of continued equipment operations with respect to price changes, etc.).

The communication links included in the rack equipment power pricing plan control system 100 communicate information between components of system 100. Communication link 151 communicatively couples power pricing plan control component 187 to other equipment (e.g., server 111, 112 and 113 and disk array 181) in rack 110. Communication link 152 communicatively couples power pricing plan control component 188 to other equipment in rack 120. Communication link 153 communicatively couples power pricing plan control component 189 to other equipment in rack 130. Communication link 155 communicatively couples master power pricing plan control center 150, power pricing plan control components 187, 188, and 189, and HVAC controller 140. There are a variety of configurations that are compatible with present invention communication links. A present invention communication link can be established by "injecting" (e.g., modulating) a signal on a power cord (e.g., AC or DC line cord), an RS-485 system, an Ethernet 10/100/1000bT local area network (LAN), and/or wireless communications channels.

Power pricing plan control components 187, 188, 189 and master power pricing plan control component 150 change rack equipment and rack area support equipment operations in accordance with policies and objectives of a power pricing plan. The power pricing plan facilitates imposition of rack equipment operational changes based upon power pricing plan guidelines. For example, the power pricing plan can define operational settings of the rack equipment for power prices. The power pricing plan control components analyze the power pricing plan policy information in conjunction with equipment description information to formulate instructions to change operational settings of the equipment in racks 110, 120 and 130 and related support equipment. For example, the instruction can change operation settings and performance levels of the rack equipment. In one embodiment, the power pricing plan control instructions maintain rack equipment operation within the power consumption and heat dissipation budget as well as power pricing plan guidelines. The changes can facilitate maximization of tradeoffs between performance and price. The changes can also facilitate optimization of price and power consumption/thermal dissipation. The power pricing plan can be dynamically adjusted on the fly.

With reference still to FIG. 1, there are a variety of ways in which master power pricing plan control component 150 and power pricing plan control components 187, 188 and 189 change the operation settings of equipment included in rack equipment power pricing plan control system 100. For example, power pricing plan control components 187, 188 and 189 can direct changes in the frequency and operating voltage characteristics of equipment included in racks 110, 120 and 130 respectively. Power pricing plan control components 187, 188 and 189 can also instruct equipment included in racks 110 through 130 respectively to turn on or off. Alternatively power pricing plan control components 187, 188 and 189 can instruct execution components (e.g., parallel processors, pipelines, etc.) and/or portions of a memory component (e.g., a disk array, etc.) to turn on or off. A power pricing plan control component can make the changes in a manner that optimally balances power costs and performance of processing activities. For example, continue to provide power to high priority processing activities while reducing power supplied to lower priority processing activities. The balance can be adjusted for price changes related to time of day, time of the year, state of the economy, etc.

Master power pricing plan control component 150 and power pricing plan control components 187, 188 and 189 can also direct operational setting changes to various other detection and support components. Auxiliary power unit 171 provides auxiliary power in accordance with directions from master power pricing plan control component 150 based upon power pricing plan guidelines. HVAC controller 140 controls the heating, venting and cooling equipment associated with an area in which equipment racks 110, 120 and 130 are located. For example, HVAC controller 140 controls fan 141, heater 142 and an air conditioning unit (not shown) that vent, heat, and cool the area (e.g., a room) in which equipment racks 110, 120 and 130 are located. Master power pricing plan control component 150 also directs operational setting changes in fan 141, heater 142 and the air conditioning unit (not shown) via HVAC controller 140.

Power pricing plan control components (e.g., 187, 188, 189 and/or 150) can also comprise an interface for facilitating user interaction with rack equipment adjustments based upon power supply conditions. The interface allows operators or other equipment (e.g., remote resources coupled via a network) to manually and/or automatically participate in changes to rack equipment operational settings. The interface is a mechanism for communicating information to and from an operator or user. For example, the interface can enable operator intervention and provides a variety of power supply and performance related information in a cohesive, user friendly presentation.

Figure 2:
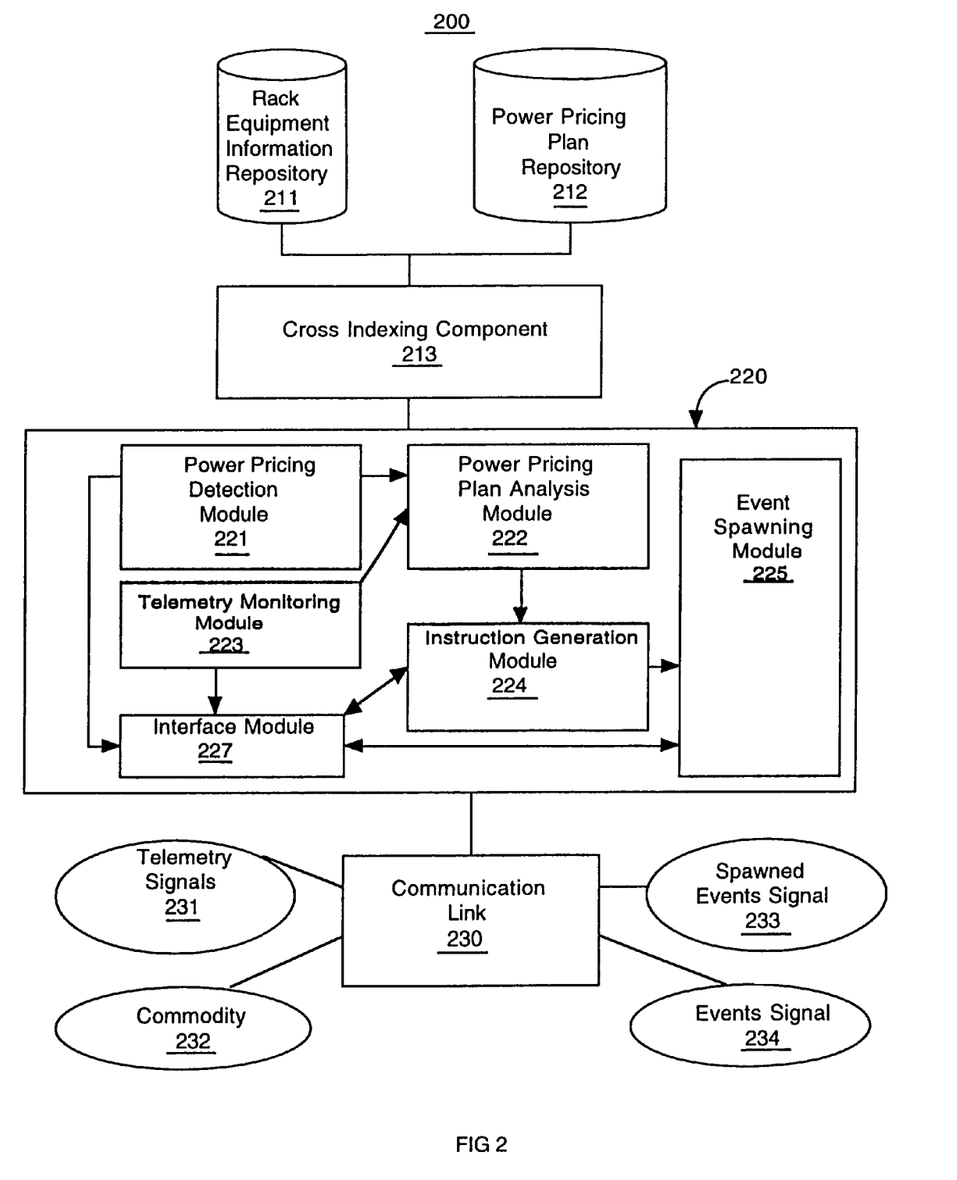
FIG. 2 is an illustration of a power pricing plan control component in accordance with one embodiment of the present invention.

FIG. 2 is an illustration of power pricing plan control component 200, one embodiment of a present invention power pricing plan control component. Power pricing plan control component 200 includes rack equipment information repository 211, rack equipment power pricing plan repository 212, cross indexing component 213, power pricing plan processing component 220, and communication link component 230. The components of power pricing plan control component 200 cooperatively operate to change operation settings of rack equipment based upon power pricing plan policies. Equipment information repository 211 stores information about equipment included in the rack (e.g., rack equipment description information). Rack equipment power pricing plan repository 212 stores information on power pricing plans (e.g., policy guidelines and plan objectives). Cross indexing component 213 correlates equipment information and power pricing plan information. Power pricing plan processing component 220 processes instructions for changing operation settings associated with power pricing plan guidelines. Power pricing plan control component 200 utilizes communication link 230 for external communications. For example, power pricing plan control component 200 utilizes communication link 230 to forward and receive telemetry signals 231, commodity signals 232, spawned event signals 233 and trigger event signals 234.

In one embodiment, power pricing plan processing component 220 includes power pricing detection module 221, power pricing plan analysis module 222, telemetry collection module 223, instruction generation module 224, event spawning module 225 and interface module 227. Power pricing detection module 221 detects indications of power pricing changes covered by a power pricing plan. plan. Power pricing plan analysis module 222 ascertains power pricing plan instructions associated with power pricing changes. Telemetry monitoring module 223 monitors characteristics and activity information of equipment associated with said power pricing plan. Instruction generation module 224 generates rack equipment performance adjustment commands for implementing the power pricing plan instructions. Event spawning module 225 generates power pricing plan trigger events. Interface module 227 performs interface operations.

Power pricing plan pricing detection module 221 can detect indications of a variety of power pricing incidents designated in a power pricing plan. If power pricing detection module 221 receives an indication of a power price change or triggering event, power pricing plan detection module 221 sends an indication of the power pricing trigger to power pricing plan analysis module 222 for analysis and processing. For example, power pricing detection module 221 can notice indications of price changes and forwards notification of the change to power pricing plan analysis module 222. Power pricing detection module 221 can receive the notice from telemetry collection module 223 and can determine if the telemetry information indicates the occurrence of a change in the price or power.

Power pricing plan analysis module 222 can analyze a variety of different power pricing plan policy objectives in response to an indication of a power price change. The power pricing plan analysis module 222 can determine appropriate actions for implementing the power pricing plan objectives. The power pricing plan analysis module 222 can determine if the occurrence of a power price change indicates a modification to the operating settings of rack equipment (e.g., return to its prior condition and/or a condition indicated in a power pricing plan policy objective). The power pricing plan analysis module 222 can also determine if actions or corrections to operational settings are limited by other policy constraints. For example, power pricing plan analysis module 222 can determine if a power consumption and heat dissipation budget limit power plan objective actions or if any of the policies contradict or limit each other. The power pricing plan analysis module 222 provides an indication of the action (e.g., a temperature change) to instruction generation module 224.

Telemetry monitoring module 223 can be utilized to monitor telemetry information associated with various different change in power pricing. For example, telemetry monitoring module 223 is readily adaptable for utilization with different power supply interfaces, including different types and brands of power utility interfaces, power generation systems, and other temporary power supply systems (e.g., uninterruptible power supply systems). Telemetry monitoring module 223 is also readily adaptable for utilization with a variety of different rack equipment. Telemetry monitoring module 223 can also direct collection or retrieval of information for confirming operational settings and performance adjustment commands are complied with. Telemetry module 223 can also direct retrieval of rack equipment description information (e.g., rack equipment operation settings and performance levels) and support equipment (e.g., HVAC units).

Instruction generation module 224 is capable of creating a variety of different instructions in response to notifications received from power pricing plan analysis module 222. Instruction generation module 224 can extract instruction protocol and syntax requirements from rack equipment description information (e.g., included in a rack equipment repository). The instructions can direct a change in rack equipment and/or support equipment operating settings. For example, the instructions can direct a change in a temperature setting of HVAC support equipment and/or heat dissipation level for the rack equipment. The instructions can include a command or direction to change the operating frequency, change the voltage of supply power or turn on/off rack equipment and/or support equipment (e.g., fan 141, heater 142, auxiliary power unit 171, etc.). The operation adjustment instructions can be forwarded to rack equipment and associated support equipment. For example, instruction creation module 224 can forward operation adjustment instructions to change the operation settings of the rack equipment.

Event spawning module 225 spawns power pricing plan trigger events. Event spawning module 225 can spawn a power pricing plan triggering event that causes a power pricing plan control component to interface with other power pricing plan control components. Alternatively, event spawning module 225 can spawn a power pricing plan triggering event directly for rack equipment under the control of other power pricing plan control components, clients, and/or external support operations (e.g., a power utility). For example, master power pricing plan control component 150 can receive indications of a power supply fluctuation from utility 191 and spawn a triggering event indication to power pricing plan control component 187, 188 and/or 189. Conversely, power pricing plan control components 187, 188 and 189 can spawn a triggering event requesting more power that causes master power pricing plan control component 150 to direct auxiliary power 171 to increase or decrease the power supply in accordance with a predetermined power pricing plan policy.

In one embodiment of the present invention, a power pricing plan control component (e.g., 187) is included in an intelligent power distribution unit (IPDU). The IPDU can be utilized to aggregate multiple power line cords from rack equipment into a smaller number of power line cords at a rack level. In one exemplary implementation in which power cords are used as a present invention communication link, the presence of each piece of rack equipment can be detected as the rack equipment is communicatively coupled to the IDPU. In addition, information associated with the piece of rack equipment (e.g., power and thermal performance operating points, information indicating the type of rack equipment, characteristics of the rack equipment, etc.) can be automatically communicated to the IPDU. Even if a piece of rack equipment does not have an available relevant descriptive information store itself, the IPDU can sense current draw and account for unregulated use in equipment rack management policy decisions.

Figure 3:
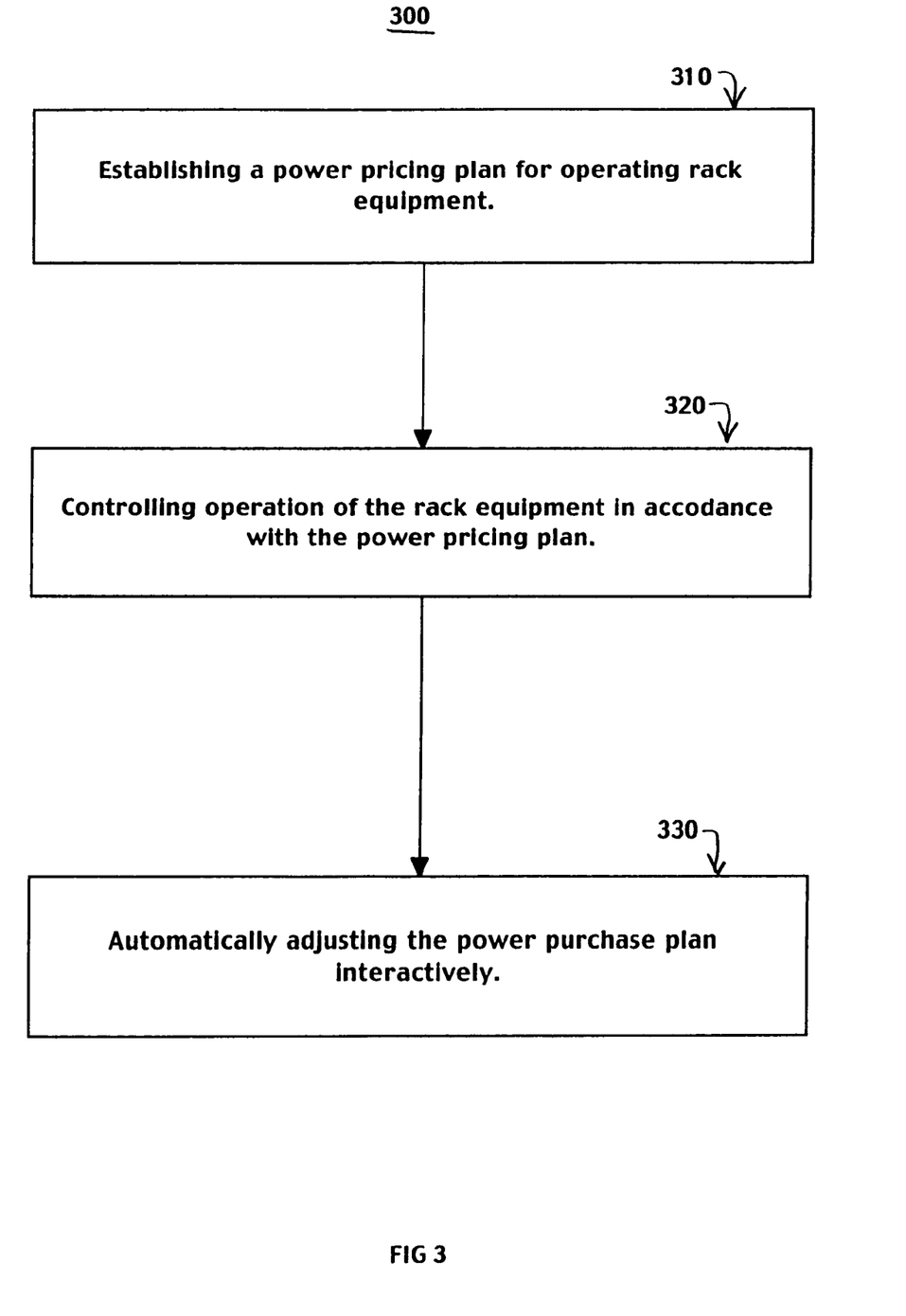
FIG. 3 is a flow chart of a power pricing control method in accordance with one embodiment of the present invention.

FIG. 3 is a flow chart of power pricing plan control method 300 in accordance with one embodiment of the present invention. Power pricing plan control method 300 establishes a communication and control protocol for automatic control of rack equipment operating conditions based upon a power pricing plan. The communication and control protocol also facilitates manipulation of rack equipment operation and performance in accordance with a rack equipment power pricing plan or policies. Power pricing plan control method 300 also provides an interface for presenting information in a convenient manner to a user.

In step 310, a power pricing plan for operating rack equipment is established. In one embodiment of the present invention, a power pricing plan includes instructions to turn off rack equipment if power prices increase beyond predetermined thresholds and turn on rack equipment if power prices decrease below predetermined thresholds. The power pricing plan can include instructions to reduce a voltage and/or a frequency of the rack equipment when the price for power increases. The power pricing plan can also include instructions to increase a voltage and/or a frequency of the rack equipment when the price for power decreases. It is appreciated that a power price plan is flexibly adaptable to a variety of implementations. For example, a power price plan can include instructions to make similar changes (e.g., turn on/off, change voltage/frequency, etc.) to the operation of support equipment (e.g., HVAC controller 140, auxiliary power unit 171, etc.). The power pricing plan can include guidelines corresponding to agreements for adjusting rack equipment in response to a power price change. For example rack equipment can be turned off in response to peak load pricing.

In step 320, operation of the rack equipment is controlled in accordance with the power pricing plan. For example, instructions for controlling the rack equipment are generated and communicated to the rack equipment. In one exemplary implementation, a power pricing change in detected. For example, information indicating a power pricing trigger event (e.g., power price change) is received. For example, the information can include an indication of a change in the power price (e.g., rolling blackouts, utility service interruption, etc.). A correspondence of performance control instructions included in the power pricing plan and the received power price change are analyzed and instruction to change power consumption of rack equipment based upon the power pricing plan is sent to the rack equipment and/or support equipment. For example, the change can include turning on/off rack equipment associated with data processing. In one implementation, the instruction corresponds to an operation setting action set forth in a power pricing plan for detection of a particular price change. For example, the command can include determining an appropriate adjustment setting for rack equipment (e.g., heat dissipation settings) and/or support equipment (e.g., auxiliary power supply setting) in response to a particular power price change. The instruction can also be tailored to possible actions available for a particular piece of rack equipment.

In one embodiment, implementation of a power consumption change is checked. For example, equipment setting changes are checked for compliance with the power pricing plan guidelines. The equipment can include rack equipment and support equipment. The equipment setting changes are directed to bring operation of the rack equipment within guidelines set forth in a power pricing plan. In one exemplary implementation, instructions for change the equipment settings are forwarded to the rack equipment and the response of the equipment is checked. The setting changes can change the power consumption and thermal load of the rack equipment. For example, the changes can result in an increase or decrease in the heat dissipated by the rack.

In step 330, the power pricing plan is automatically adjusted interactively. In one embodiment the power pricing plan is adjusted via a power pricing plan adjustment interface. The interface activities also include presenting information in a convenient and user friendly manner. For example, power pricing plan information, corresponding rack equipment description information and telemetry information (e.g., operating level settings) can be displayed. Similar information associated with rack support equipment (e.g., HVAC equipment, auxiliary power, etc.) can also be presented. The interface activities also include automatically adjusting the power pricing plan interactively.

Figure 4:
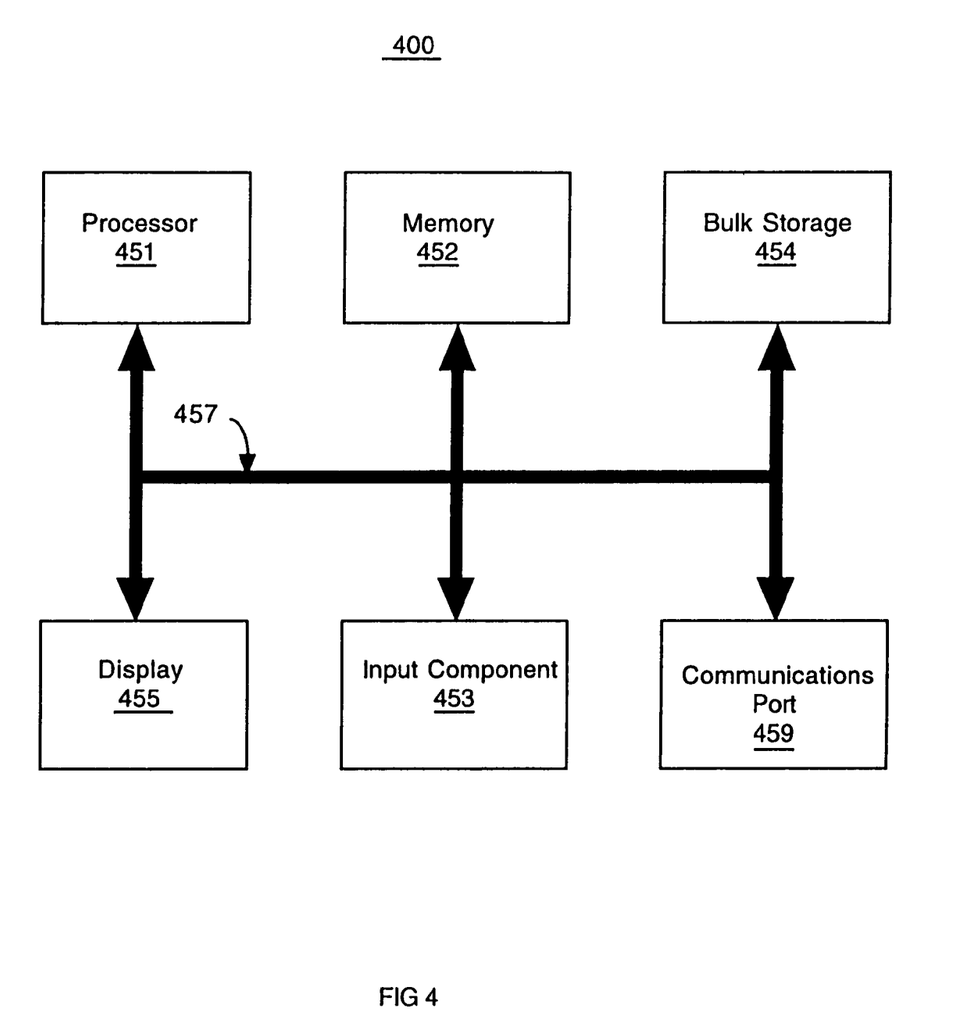
FIG. 4 is a block diagram of one embodiment of a computer system on which the present invention can be implemented.

FIG. 4 is a block diagram of computer system 400, one embodiment of a computer system on which the present invention can be implemented. For example, computer system 400 can be utilized to implement power pricing plan processing component 220 or power pricing plan control method 300. Computer system 400 includes communication bus 457, processor 451, memory 452, input component 453, bulk storage component 454 (e.g., a disk drive), network communication port 459 and display module 455. Communication bus 457 is coupled to central processor 451, memory 452, input component 453, bulk storage component 454, network communication port 459 and display module 455.

The components of computer system 400 cooperatively function to provide a variety of functions, including directing changes in rack equipment operational settings in accordance with a power pricing plan of the present invention. Communication bus 457 communicates information within computer system 400. Processor 451 processes information and instructions, including instructions and information for changing rack equipment operation and performance (e.g., processor 451 processes power pricing detection module 221 instructions, power pricing plan analysis module 222 instructions, telemetry monitoring module 223 instructions, instruction generation module 224 instructions, etc.). Memory 452 stores information and instructions, including instructions for implementing a rack equipment power pricing plan. Bulk storage component 454 also provides storage of information (e.g., rack equipment description information, policy information, etc.). One embodiment of a present interface can be implemented by input component 453, display module 455 and network communications port 459. Input component 453 facilitates communication of information (e.g., operator policy initiated changes, operator entered rack equipment description information, operator intervention in rack equipment operation changes, etc.) to computer system 400. Display module 455 displays information to a user (e.g., a graphical user interface conveying rack equipment operation settings and performance levels, rack equipment description information, power pricing plan policy information, correlation between the information, etc.). Network communication port 459 provides a communication port for communicatively coupling with a network (e.g., for communicating power pricing plan related information with a client, a utility, a remote operator and/or control center, etc.).

Thus, a present invention rack equipment power pricing plan system and method facilitates convenient and efficient operation of rack equipment based upon a power pricing plan. The rack equipment power pricing plan permits automated implementation of rack equipment power pricing policies and associated economic management objectives. For example, the present inventions can assist centralized computer facilities to cope with power price changes in a beneficial manner. Automatic direction of equipment operation setting and performance level adjustments is provided to meet the rack equipment power pricing plan objectives while staying within power consumption and heat dissipation budget levels. Equipment description information, policy information and rack equipment operation modification commands are automatically communicated via communication links implementing a rack equipment management protocol. The communication links are flexibly adaptive to a variety of implementations and can be implemented on an available communication medium (e.g., power line cords). The present invention also provides a convenient and efficient interface that can correlate diverse rack equipment management and power pricing information in a unified manner.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various modifications as are suited to the particular use contemplated. It is intended that the scope of the invention be defined by the claims appended hereto and their equivalents.

What is claimed is:

1. A power pricing plan rack equipment control method comprising:
   establishing a power pricing plan for operating rack equipment; and
   controlling operation of said rack equipment in accordance with said power pricing plan, wherein said power pricing plan enables said rack equipment to provide more power to a higher priority processing activity while providing less power to a lower priority processing activity.

2. The method of claim 1, wherein controlling said operation includes rack equipment performance settings.

3. The method of claim 1, wherein controlling said operation includes changing power consumption by said rack equipment in accordance with said power pricing plan.

4. The method of claim 3, wherein said power pricing plan indicates a reduction in a voltage and a frequency of said rack equipment when a price for power increases.

5. The method of claim 3, wherein said power pricing plan indicates an increase in a voltage and a frequency of said equipment when a price for power decreases.

6. The method of claim 1, wherein said controlling said operation comprises automatically adjusting said performance interactively.

7. The method of claim 1, further comprising:
   receiving an indication of power pricing change; and
   analyzing correspondence of said power pricing change to performance control instructions included in said power pricing plan.

8. An computer-useable storage medium comprising computer-readable program code embodied therein for causing a computer system to execute power pricing performance instructions comprising:
   a power pricing detection module for detecting indications of power pricing fluctuations covered by a power pricing plan;
   a power pricing plan policy module for ascertaining power pricing plan instructions associated with said power pricing fluctuations; and
   an instruction generation module for generating rack equipment performance adjustment commands to implement said power pricing plan instructions, wherein said power pricing plan enables providing more power to a higher priority processing activity while providing less power to a lower priority processing activity.

9. The computer-useable storage medium of claim 8, further comprising computer executable instructions for a telemetry monitoring module for monitoring characteristics and activity of rack equipment associated with said adjustment commands.

10. The computer-useable storage medium of claim 8, further comprising computer executable instructions for a power pricing event spawning module for generating power pricing events.

11. The computer-useable storage medium of claim 8, wherein said instruction generation module further comprises computer executable instructions for functionality for generating a command to postpone processing.

12. The computer-useable storage medium of claim 8, further comprises instructions for power pricing plan information that comprises computer executable instructions that when executed enable an agreement between a host and a client and said instructions enable said power pricing information Plan to be structured in a manner to accommodate business activities of said client.

13. The computer-useable storage medium of claim 9, wherein said telemetry monitoring module further comprises computer executable instructions for confirming said performance adjustments commands are complied with.

14. A power pricing rack equipment control system comprising:
   rack equipment for processing data;
   a power pricing plan component for controlling said rack equipment based on a power pricing plan policy, wherein said power pricing plan policy enables said rack equipment to provide more power to a higher priority processing activity while providing less power to a lower priority processing activity; and
   a communications bus for coupling said rack equipment and said power pricing plan control component, wherein said communications bus is utilized for communicating information between said power pricing plan control component and said rack equipment.

15. The power pricing rack equipment control system of claim 14, wherein said power pricing plan component is operable to modulate power consumed by said rack equipment in accordance with said power pricing plan policy.

16. The power pricing rack equipment control system of claim 14, wherein said power pricing plan component is operable to switch on and off said rack equipment in accordance with said power pricing plan policy.

17. The power pricing rack equipment control system of claim 14, further comprising a master management control center for coordinating control of rack equipment among a plurality of racks.

18. The power pricing rack equipment control system of claim 14, wherein said power pricing plan policy is dynamically adjustable on the fly.

19. The power pricing rack equipment control system of claim 14, wherein said power pricing plan policy is structured in accordance with business needs of a client.

20. The power pricing rack equipment control system of claim 14, further comprising:
   a memory for storing equipment information and power pricing plan policy information; and
   a cross indexing component for cross indexing said equipment information and said power pricing plan policy information.

* * * * *

UNITED STATES PATENT AND TRADEMARK OFFICE
CERTIFICATE OF CORRECTION

| | |
|---|---|
| PATENT NO. | : 7,386,744 B2 |
| APPLICATION NO. | : 10/801247 |
| DATED | : June 10, 2008 |
| INVENTOR(S) | : Barr et al. |

It is certified that error appears in the above-identified patent and that said Letters Patent is hereby corrected as shown below:

In column 5, line 4, after "pricing plan." delete "plan.".

In column 9, line 44, in Claim 7, after "of" insert -- a --.

In column 9, line 48, in Claim 8, delete "An" and insert -- A --, therefor.

In column 10, line 18, in Claim 12, delete "Plan" and insert -- plan --, therefor.

Signed and Sealed this

Ninth Day of September, 2008

JON W. DUDAS
*Director of the United States Patent and Trademark Office*